United States Patent
Oda et al.

(10) Patent No.: US 11,031,771 B2
(45) Date of Patent: Jun. 8, 2021

(54) POWER SUPPLY CONTROL APPARATUS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Kota Oda, Mie (JP); Katsuma Tsukamoto, Mie (JP); Keisuke Wakazono, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 221 days.

(21) Appl. No.: 16/310,903

(22) PCT Filed: Jun. 7, 2017

(86) PCT No.: PCT/JP2017/021069
§ 371 (c)(1),
(2) Date: Dec. 18, 2018

(87) PCT Pub. No.: WO2017/221697
PCT Pub. Date: Dec. 28, 2017

(65) Prior Publication Data
US 2019/0267795 A1 Aug. 29, 2019

(30) Foreign Application Priority Data

Jun. 21, 2016 (JP) .............................. JP2016-122816

(51) Int. Cl.
*H02H 7/12* (2006.01)
*B60R 16/033* (2006.01)
(Continued)

(52) U.S. Cl.
CPC ............. *H02H 7/12* (2013.01); *B60R 16/033* (2013.01); *H02H 1/0007* (2013.01); *H02H 3/087* (2013.01); *H02H 7/20* (2013.01)

(58) Field of Classification Search
CPC .......... H02H 1/0007; H02H 1/06; H02H 3/08; H02H 3/087; H02H 7/12; H02H 7/1213; H02H 7/20; B60R 16/03; B60R 16/003
See application file for complete search history.

(56) References Cited

U.S. PATENT DOCUMENTS 5,909,112 A * 6/1999 Kiyota .................... G05F 1/573
323/315
2006/0187604 A1* 8/2006 Ohshima ............ H03K 17/0822
361/100

(Continued)

FOREIGN PATENT DOCUMENTS

JP       2002-017036 A     1/2002
WO    WO-2005046017 A1 *  5/2005  .............. H01M 2/34

OTHER PUBLICATIONS

International Search Report, Application No. PCT/JP2017/021069, dated Jul. 11, 2017.

*Primary Examiner* — Matthew V Nguyen
(74) *Attorney, Agent, or Firm* — Honigman LLP

(57) ABSTRACT

A power supply control apparatus controls power supply via a semiconductor switch, by a driving circuit turning ON or OFF the semiconductor switch. A current circuit pulls in a current from the drain of the semiconductor switch via a resistance. The current value Ic of the current that is pulled in by the current circuit fluctuates in the same direction as a fluctuation direction of the ON resistance value of the semiconductor switch, depending on the ambient temperature of the semiconductor switch. If the source voltage of the (Continued)

semiconductor switch is lower than a voltage at the other end of the resistance, the driving circuit turns OFF the semiconductor switch.

3 Claims, 7 Drawing Sheets

(51) Int. Cl.
*H02H 1/00* (2006.01)
*H02H 7/20* (2006.01)
*H02H 3/087* (2006.01)

(56) References Cited

U.S. PATENT DOCUMENTS

| | | |
|---|---|---|
| 2007/0103832 A1 | 5/2007 | Ohshima |
| 2017/0018918 A1 | 1/2017 | Yano et al. |
| 2019/0260338 A1* | 8/2019 | Oda .................... H03F 3/45475 |

* cited by examiner

Legend:
A= Predetermined time period

POWER SUPPLY CONTROL APPARATUS

CROSS-REFERENCE TO RELATED APPLICATIONS

This application is the U.S. national stage of PCT/JP2017/021069 filed Jun. 7, 2017, which claims priority of Japanese Patent Application No. JP 2016-122816 filed Jun. 21, 2016.

TECHNICAL FIELD

The present disclosure relates to a power supply control apparatus for controlling power supply through a semiconductor switch.

BACKGROUND

A vehicle may be provided with a power supply control apparatus for controlling power supply from a battery to a load (see JP 2011-85470A, for example). The power supply control apparatus disclosed in JP 2011-85470A is provided with an FET (Field Effect Transistor) serving as a semiconductor switch in a power supply path from a battery to a load. The power supply control apparatus controls power supply via the FET by turning the FET ON or OFF.

The power supply control apparatus disclosed in JP 2011-85470A detects a current proportional to a voltage between the drain and the source of the FET, and calculates the current flowing through the drain and the source of the FET based on the detected current. The ON resistance of the FET fluctuates depending on the ambient temperature of the FET. Accordingly, even if the current flowing through the drain and source of the FET is constant, when the ambient temperature fluctuates, the voltage between the drain and source of the FET, that is, the detected current fluctuates.

For this reason, the power supply control apparatus disclosed in JP 2011-85470A calculates the current flowing through the drain and source of the FET, based on the detected current and the ambient temperature of the FET. As a result, the current to be calculated hardly fluctuates depending on the ambient temperature of the FET. If the calculated current exceeds a threshold, the FET is turned OFF to prevent an overcurrent from flowing through the power supply path from the battery to the load.

Disclosure

However, the power supply control apparatus disclosed in JP 2011-85470A requires to have an expensive CPU (Central Processing Unit) to calculate the current. For this reason, the power supply control apparatus disclosed in JP 2011-85470A has the problem that its manufacturing cost increases. Furthermore, because it takes time for the CPU to calculate the current, there is the problem that the FET cannot be immediately turned OFF if the current flowing via the FET exceeds the threshold.

The present disclosure has been made in view of such circumstances, and it is an object thereof to provide an inexpensive power supply control apparatus that can immediately turn OFF a semiconductor switch if a current flowing via the semiconductor switch exceeds a threshold.

SUMMARY

A power supply control apparatus according to the present disclosure is a power supply control apparatus for controlling power supply via a semiconductor switch, the power supply control apparatus including: a resistance whose one end is connected to a current input terminal of the semiconductor switch; a current circuit that is connected to the other end of the resistance and configured to pull in, via the resistance, a current whose current value fluctuates, depending on an ambient temperature of the semiconductor switch, in the same direction as a fluctuation direction of an ON resistance value of the semiconductor switch; and a switching unit configured to turn OFF the semiconductor switch if a voltage at a current output terminal of the semiconductor switch is lower than a voltage at the other end of the resistance.

In the present disclosure, for example, the positive electrode of a battery is connected to the current input terminal of the semiconductor switch. The current circuit pulls in a current from the current input terminal of the semiconductor switch via the resistance. Accordingly, the voltage drops in the resistance. The width of the voltage drop is expressed as "the resistance value of the resistance"·"the current value of the current pulled in by the current circuit". Here, the symbol "·" expresses a multiplication. The voltage at the other end of the resistance is expressed as "the output voltage value of the battery"-"the resistance value of the resistance"·"the current value of the current pulled in by the current circuit". Also, the voltage at the output terminal of the semiconductor switch is expressed as "the output voltage value of the battery"-"the voltage value across the semiconductor switch".

Whether the voltage at the output terminal of the semiconductor switch is less than the voltage of the other end of the resistance corresponds to whether the voltage across the semiconductor switch exceeds "the resistance value of the resistance"·"the current value of the current pulled in by the current circuit". If the semiconductor switch is ON, the voltage across the semiconductor switch is expressed as "the ON resistance value of the semiconductor switch"·"the current value of the current flowing via the semiconductor switch". Accordingly, when the semiconductor switch is ON, whether the voltage across the semiconductor switch exceeds "the resistance value of the resistance"·"the current value of the current pulled in by the current circuit" corresponds to whether the current flowing through the semiconductor switch exceeds "the resistance value of the resistance"·"the current value of the current pulled in by the current circuit"/"the ON resistance value of the semiconductor switch".

If the ambient temperature of the semiconductor switch fluctuates, the current value of the current pulled in by the current circuit fluctuates in the same direction as the fluctuation direction of the ON resistance value of the semiconductor switch. For this reason, the threshold given by "the resistance value of the resistance"·"the current value of the current pulled in by the current circuit"/"the ON resistance value of the semiconductor switch" is approximately constant, regardless of the ambient temperature of the semiconductor switch. Also, because the calculation of the current flowing via the semiconductor switch is not required, it is possible to immediately turn OFF the semiconductor switch if the current flowing via the semiconductor switch exceeds the threshold, and thus the manufacturing cost of the apparatus is inexpensive.

The power supply control apparatus according to the present disclosure, if the ambient temperature is constant, the current value is approximately constant regardless of the voltage at the current input terminal of the semiconductor switch.

In the present disclosure, even if the voltage at the current input terminal of the semiconductor switch, for example, the output voltage of the battery whose positive electrode is connected to the current input terminal fluctuates, the current that is pulled in by the current circuit hardly fluctuates. For this reason, the threshold of the current flowing via the semiconductor switch hardly fluctuates depending on the voltage at the current input terminal of the semiconductor switch.

In the power supply control apparatus according to the present disclosure, the current circuit has: a transistor that has a first terminal connected to the other end of the resistance, a second terminal to which a constant voltage is applied, and a third terminal, a resistance value of the transistor between the first terminal and the third terminal being adjusted such that the voltage between the second terminal and the third terminal is a predetermined voltage: and a resistor whose one end is connected to the third terminal of the transistor and whose resistance value fluctuates in a direction opposite to the fluctuation direction depending on the ambient temperature.

In the present disclosure, the current circuit has, for example, an NPN bipolar transistor. In this case, the collector of the bipolar transistor is connected to the other end of the resistance, and its emitter is connected to the one end of the resistor. The bipolar transistor adjusts the resistance value between its collector and emitter such that the voltage between its base and emitter is predetermined voltage. A certain voltage is applied to the base of the bipolar transistor. For this reason, the bipolar transistor adjusts the current flowing through the resistor, that is, the current flowing through the resistance such that the voltage at the base is a specified voltage. Accordingly, the current flowing through the resistance increases if the resistance value of the resistor increases, and decreases if the resistance value of the resistor decreases.

The resistance value of the resistor fluctuates, depending on the ambient temperature of the semiconductor switch, in the direction opposite to the fluctuation direction of the ON resistance of the semiconductor switch. Accordingly, the current flowing through the resistance fluctuates in the same direction as the fluctuation direction of the ON resistance of the semiconductor switch depending on the ambient temperature of the semiconductor switch.

In the power supply control apparatus according to the present disclosure, the resistor has a second resistance whose one end is connected to the third terminal of the transistor, and a series circuit that is constituted by a third resistance and a thermistor, and is connected to the second resistance in parallel, wherein a resistance value of the thermistor fluctuates in the opposite direction depending on the ambient temperature.

In the present disclosure, in the resistor, the series circuit constituted by the third resistance and the thermistor is connected to the second resistance in parallel. Accordingly, the resistance value of the resistor becomes larger as the resistance value of the thermistor increases. The resistance value of the thermistor fluctuates, depending on the ambient temperature of the semiconductor switch, in the direction opposite to the fluctuation direction of the ON resistance of the semiconductor switch. For this reason, the resistance value of the resistor fluctuates, depending on the ambient temperature of the semiconductor switch, in the direction opposite to the fluctuation direction of the ON resistance of the semiconductor switch. If the resistance value of the thermistor is infinite, the resistance value of the resistor is the resistance value of the second resistance, and is the largest. If the resistance value of the thermistor is approximately zero ohms, the resistance value of the resistor is the resistance value of the circuit in which the third resistance is connected to the second resistance in parallel, and is the smallest.

Advantageous Effects of Disclosure

With the present disclosure, if the current flowing via the semiconductor switch is larger than or equal to the threshold, it is possible to immediately turn OFF the semiconductor switch.

DETAILED DESCRIPTION OF PREFERRED EMBODIMENTS

The following describes the present disclosure based on the diagrams of the embodiments.

First Embodiment

Figure 1:
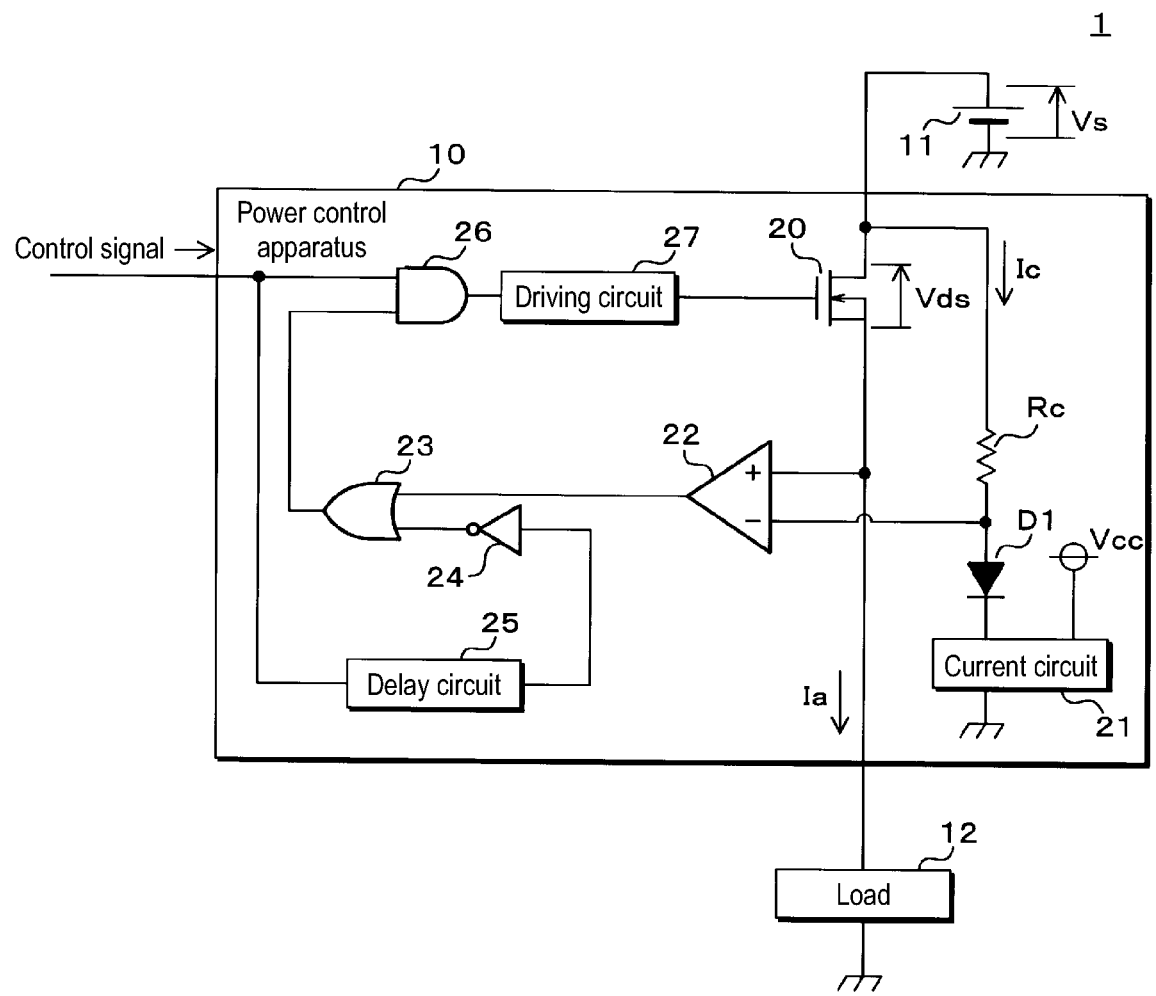
FIG. 1 is a circuit diagram of a power supply system according to a first embodiment.

FIG. 1 is a circuit diagram of a power supply system 1 according to the first embodiment. The power supply system 1 is preferably installed in a vehicle, and includes a power supply control apparatus 10, a battery 11, and a load 12. The power supply control apparatus 10 is connected to a positive electrode of the battery 11 and one end of the load 12. A negative electrode of the battery 11 and the other end of the load 12 are grounded.

The load 12 is an electrical device that is installed in the vehicle. Power is supplied from the battery 11 to the load 12 via the power supply control apparatus 10. If power is supplied from the battery 11 to the load 12, the load 12 operates. If the power supply is stopped from the battery 11 to the load 12, the load 12 stops operating. The power supply control apparatus 10 receives a control signal constituted by a high level voltage and a low level voltage. The power supply control apparatus 10 controls the power supply from the battery 11 to the load 12, based on the received control signal.

An output voltage Vs of the battery 11 fluctuates. In addition to the power supply control apparatus 10, for example, a motor for starting the engine of the vehicle, that is, a starter is connected to the positive electrode of the battery 11. In this case, the battery 11 supplies the power not only to the load 12, but also to the starter.

The battery 11 outputs a voltage via a not-shown internal resistance. Furthermore, while the starter operates, the current flowing from the battery 11 to the starter is larger than the current flowing from the battery 11 to the load 12. For this reason, if the starter operates, a large voltage drop occurs at the internal resistance of the battery 11, and the output voltage Vs of the battery 11 decreases. If the starter stops operating, the width of the voltage drop at the internal resistance of the battery 11 decreases, and the output voltage Vs of the battery 11 returns to the voltage before the starter operates. As mentioned above, the output voltage Vs of the battery 11 fluctuates, for example, depending on the operation of the starter.

The power supply control apparatus 10 has a semiconductor switch 20, a current circuit 21, a comparator 22, an OR circuit 23, an inverter 24, a delay circuit 25, an AND circuit 26, a driving circuit 27, a diode D1, and a resistance Rc. The semiconductor switch 20 is an N-channel FET.

The comparator 22 has a plus terminal, a minus terminal, and an output terminal. Each of the OR circuit 23 and the AND circuit 26 has two input terminals and one output terminal. Each of the inverter 24, the delay circuit 25, and the driving circuit 27 has one input terminal and one output terminal.

The drain of the semiconductor switch 20 is connected to the positive electrode of the battery 11, and the source of the semiconductor switch 20 is connected to the one end of the load 12. The drain of the semiconductor switch 20 is further connected to one end of the resistance Rc. The other end of the resistance Rc is connected to the minus terminal of the comparator 22 and the anode of the diode D1. The cathode of the diode D1 is connected to the current circuit 21. Accordingly, the current circuit 21 is connected to the other end of the resistance Rc via the diode D1. The current circuit 21 is further grounded.

The source of the semiconductor switch 20 is further connected to the plus terminal of the comparator 22. The output terminal of the comparator 22 is connected to one of the input terminals of the OR circuit 23. The other input terminal of the OR circuit 23 is connected to the output terminal of the inverter 24. The input terminal of the inverter 24 is connected to the output terminal of the delay circuit 25. The input terminal of the delay circuit 25 receives the control signal. The output terminal of the OR circuit 23 is connected to one of the input terminals of the AND circuit 26. The other input terminal of the AND circuit 26 receives the control signal. The output terminal of the AND circuit 26 is connected to the input terminal of the driving circuit 27. The output terminal of the driving circuit 27 is connected to the gate of the semiconductor switch 20.

The gate voltage of the semiconductor switch 20, with respect to the ground potential, is adjusted by the driving circuit 27. If the gate voltage of the semiconductor switch 20 is larger than or equal to a certain voltage, a current can flow between its drain and source. At this time, the semiconductor switch 20 is ON. Also, if the gate voltage of the semiconductor switch 20 is lower than the certain voltage, a current does not flow between its drain and source. At this time, the semiconductor switch 20 is OFF.

The driving circuit 27 turns the semiconductor switch 20 ON or OFF, by adjusting the gate voltage of the semiconductor switch 20.

A constant voltage is applied to the current circuit 21. A voltage Vcc that is applied to the current circuit 21 is constant, and is 5V for example. The minimum output voltage Vs of the battery 11 is larger than the voltage Vcc, and fluctuates, for example, within a range of 8 to 14V. The power supply control apparatus 10 further includes, for example, a not-shown regulator. In this case, the regulator generates a constant voltage from the voltage that the battery 11 outputs, and applies the generated voltage to the current circuit 21.

The current circuit 21 pulls in the current from the drain of the semiconductor switch 20 via the resistance Rc and the diode D1. If the current circuit 21 is grounded by being connected to the body of the vehicle that is a conductor, for example, the current that is pulled in by the current circuit 21 flows to the vehicle body. A current value Ic of the current that is pulled in by the current circuit 21 becomes larger as the ambient temperature of the semiconductor switch 20 increases. Also, the current value Ic hardly fluctuates even if the drain voltage of the semiconductor switch 20, that is, the output voltage Vs of the battery 11 fluctuates. If the ambient temperature of the semiconductor switch 20 is constant, the current value Ic is constant or approximately constant, regardless of the drain voltage of the semiconductor switch 20.

If the voltage at its plus terminal with respect to the ground potential is larger than or equal to the voltage at its minus terminal with respect to the ground potential, the comparator 22 outputs a high level voltage from its output terminal to the one of the input terminals of the OR circuit 23. Also, if the voltage at its plus terminal with respect to the ground potential is lower than the voltage at its minus terminal with respect to the ground potential, the comparator 22 outputs a low level voltage from its output terminal to the one of the input terminals of the OR circuit 23.

If the control signal is at a low level voltage, or if the time period, for which the control signal is at a high level voltage from the time when the voltage of the control signal was switched from a low level voltage to a high level voltage, is shorter than a predetermined time period, the delay circuit 25 outputs a low level voltage from its output terminal to the input terminal of the inverter 24. If the time period, for which the control signal is at a high level voltage from the time when the voltage of the control signal was switched from a low level voltage to a high level voltage, is longer than or equal to the predetermined time period, the delay circuit 25 outputs a high level voltage from its output terminal to the input terminal of the inverter 24.

If the delay circuit 25 outputs a high level voltage, the inverter 24 outputs a low level voltage from its output terminal to the other input terminal of the OR circuit 23. If the delay circuit 25 outputs a low level voltage, the inverter 24 outputs a high level voltage from its output terminal to the other input terminal of the OR circuit 23.

If the comparator 22 or the inverter 24 outputs a high level voltage, the OR circuit 23 outputs a high level voltage from its output terminal to the one of the input terminals of the AND circuit 26. If both the comparator 22 and the inverter 24 output a low level voltage, the OR circuit 23 outputs a low level voltage from its output terminal to the one of the input terminals of the AND circuit 26.

If the control signal is at a high level voltage and the OR circuit 23 outputs a high level voltage, the AND circuit 26 outputs a high level voltage from its output terminal to the input terminal of the driving circuit 27. If the control signal is at a low level voltage, or if the OR circuit 23 outputs a low level voltage, the AND circuit 26 outputs a low level voltage from its output terminal to the input terminal of the driving circuit 27.

If the AND circuit 26 outputs a high level voltage, the driving circuit 27 increases the gate voltage of the semiconductor switch 20, and turns ON the semiconductor switch 20. If the AND circuit 26 outputs a low level voltage, the driving circuit 27 decreases the gate voltage of the semiconductor switch 20, and turns OFF the semiconductor switch 20.

If the semiconductor switch 20 is ON, power is supplied from the battery 11 to the load 12 via the semiconductor switch 20, and the load 12 operates. If the semiconductor switch 20 is OFF, the power supply from the battery 11 to the load 12 via the semiconductor switch 20 is stopped, and the load 12 stops operating. In the power supply control apparatus 10, power supply via the semiconductor switch 20 is controlled by the driving circuit 27 turning ON or OFF the semiconductor switch 20. If the semiconductor switch 20 is ON, a current flows from the positive electrode of the battery 11 through the drain and source of the semiconductor switch 20 in this order. Accordingly, the drain of the semiconductor switch 20 serves as a current input terminal and its source serves as a current output terminal.

Figure 2:
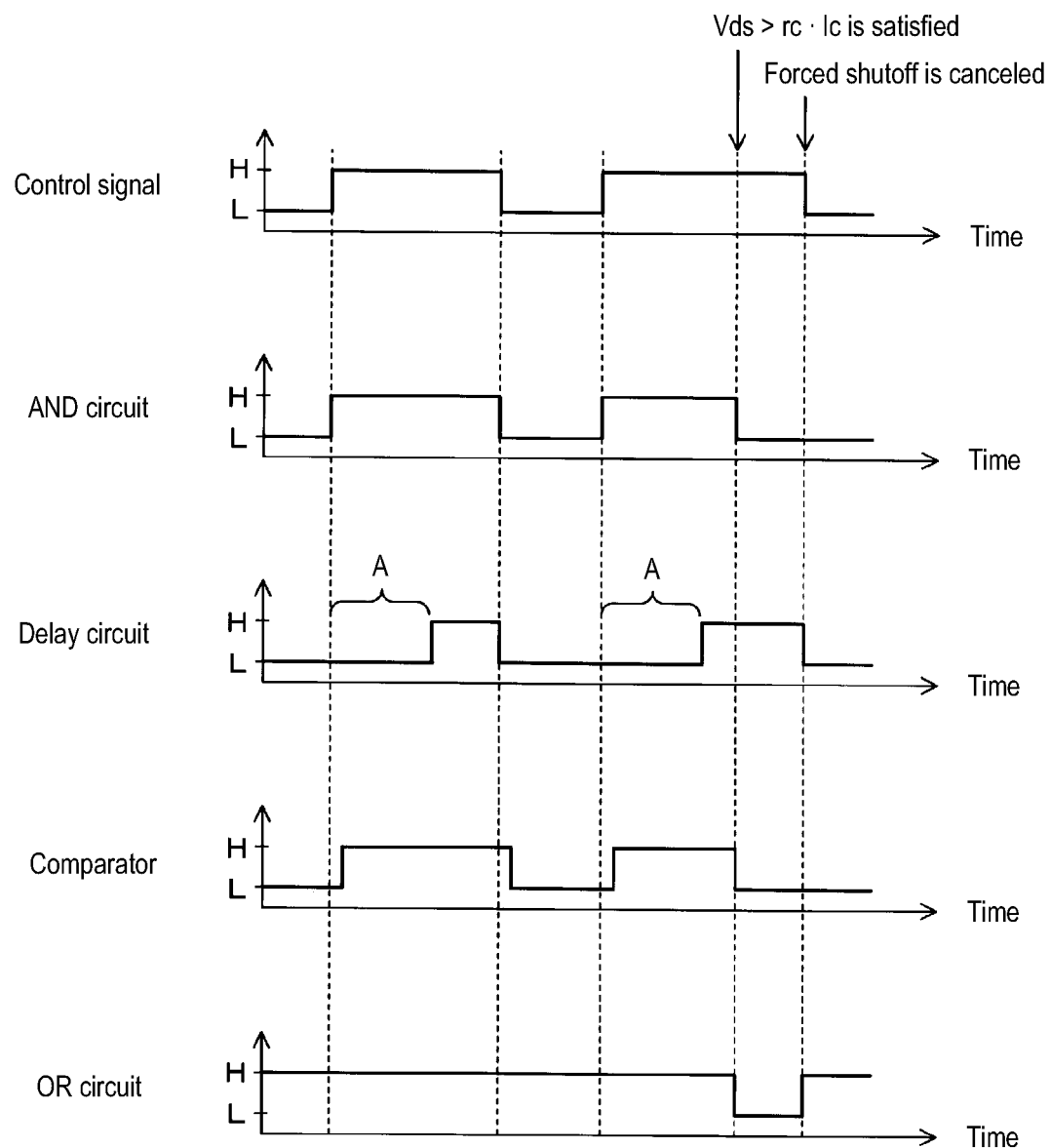
FIG. 2 is a timing chart illustrating operations of a power supply control apparatus.

FIG. 2 is a timing chart illustrating operations of the power supply control apparatus 10. In FIG. 2, the graph of the voltage of the control signal and the graphs of the voltages that are respectively output from the AND circuit 26, the delay circuit 25, the comparator 22, and the OR circuit 23 are shown. In all graphs shown in FIG. 2, the horizontal axes show time. In FIG. 2, a high level voltage is shown by "H", and a low level voltage is shown by "L".

If the control signal is at a low level voltage, the AND circuit 26 outputs a low level voltage regardless of the voltage that the OR circuit 23 outputs. For this reason, the driving circuit 27 turns OFF the semiconductor switch 20. Also, as mentioned above, if the control signal is at a low level voltage, the delay circuit 25 outputs a low level voltage, and thus the inverter 24 outputs a high level voltage. If the inverter 24 outputs a high level voltage, the OR circuit 23 outputs a high level voltage regardless of the voltage that the comparator 22 outputs.

Note, that if the control signal is at a low level voltage, that is, if the semiconductor switch 20 is OFF, the comparator 22 outputs a low level voltage.

If the semiconductor switch 20 is OFF, the voltage at the plus terminal of the comparator 22 is approximately zero volts. Also, because no power source is provided in the current circuit 21 and a current continues to flow via the resistance Rc, the voltage at the minus terminal of the comparator 22 exceeds zero volts. Accordingly, if the semiconductor switch 20 is OFF, the voltage at the plus terminal of the comparator 22 is lower than the voltage at the minus terminal of the comparator 22, and the comparator 22 outputs a low level voltage.

If the voltage of the control signal is switched from a low level voltage to a high level voltage, the delay circuit 25 continues to output a low level voltage from when the voltage of the control signal is switched until when a predetermined time period has elapsed. As mentioned above, if the delay circuit 25 outputs a low level voltage, the OR circuit 23 outputs a high level voltage regardless of the voltage that the comparator 22 outputs. For this reason, the OR circuit 23 outputs a high level voltage from when the voltage of the control signal is switched from a low level voltage to a high level voltage until when the predetermined time period has elapsed.

Accordingly, if the control signal is switched from a low level voltage to a high level voltage, because the OR circuit 23 outputs a high level voltage, the AND circuit 26 outputs a high level voltage, and the driving circuit 27 turns the semiconductor switch 20 from OFF to ON. As a result, power supply from the battery 11 starts via the semiconductor switch 20 to the load 12.

The voltage at the plus terminal of the comparator 22 is the source voltage of the semiconductor switch 20 with respect to the ground potential, and is a voltage obtained by subtracting a drain voltage Vds of the semiconductor switch 20 with respect to the source potential of the semiconductor switch 20 from the output voltage Vs of the battery 11. This voltage is expressed as "Vs−Vds". The voltage at the minus terminal of the comparator 22 is the voltage at the other end of the resistance Rc with respect to the ground potential, and is a voltage obtained by subtracting the product of the current value Ic of the current that is pulled in by the current circuit 21 and the resistance value rc of the resistance Rc from the output voltage Vs of the battery 11. This voltage is expressed as "Vs−rc·Ic". Here, the symbol "·" expresses a multiplication.

If the condition "Vs−Vds"≥"Vs−rc·Ic" is satisfied, that is, if the condition "Vds≤rc·Ic" is satisfied, the comparator 22 outputs a high level voltage. Also, if the condition "Vs−Vds"<"Vs−rc·Ic" is satisfied, that is, if the condition "Vds>rc·Ic" is satisfied, the comparator 22 outputs a low level voltage.

The voltage Vds is the product of a current value Ia of the current flowing through the load 12 via the semiconductor switch 20 and an ON resistance value ron of the semiconductor switch 20, and is expressed as ron·Ia. The voltage Vds becomes higher as the current value Ia of the current flowing via the semiconductor switch 20 increases. If the current value Ia is normal in a state where the semiconductor switch 20 is ON, the resistance value rc of the resistance Rc and the current value Ic of the current that is pulled in by the current circuit 21 are set such that the condition Vds≤rc·Ic is satisfied.

Accordingly, if the voltage of the control signal is switched from a low level voltage to a high level voltage, when the current value Ia is normal, the voltage that the comparator 22 outputs is switched from a low level voltage to a high level voltage from the time when the voltage of the control signal was switched until when the predetermined time period has elapsed, that is, while the delay circuit 25 outputs a low level voltage. After that, as long as the semiconductor switch 20 is ON and the current value Ia is normal, the comparator 22 continues to output a high level voltage. If the comparator 22 outputs a high level voltage, the OR circuit 23 outputs a high level voltage regardless of the voltage that the delay circuit 25 outputs.

As mentioned above, if the predetermined time period has elapsed from the time when the voltage of the control signal was switched from a low level voltage to a high level voltage, the delay circuit 25 switches the voltage that is output to the input terminal of the inverter 24 from a low level voltage to a high level voltage. However, if the current value Ia is normal, because the comparator 22 outputs a high level voltage at the time when the delay circuit 25 outputs a high level voltage, the OR circuit 23 continues to output a high level voltage. Accordingly, as long as the current value Ia of the current flowing via the semiconductor switch 20 is normal if the semiconductor switch is ON, the voltage that the OR circuit 23 outputs is not switched to a low level voltage due to the voltage of the control signal being switched from a low level voltage to a high level voltage.

If the voltage of the control signal is switched from a high level voltage to a low level voltage, the AND circuit 26 outputs a low level voltage regardless of the voltage that the OR circuit 23 outputs, and the driving circuit 27 turns the semiconductor switch 20 from ON to OFF. If the semiconductor switch 20 is turned from ON to OFF, as mentioned above, the comparator 22 outputs a low level voltage.

If the voltage of the control signal is switched from a high level voltage to a low level voltage, the delay circuit 25 switches the voltage that is output to the inverter 24 from a high level voltage to a low level voltage before the voltage that the comparator 22 outputs is switched from a high level voltage to a low level voltage. For this reason, because the delay circuit 25 outputs a low level voltage at the time when the voltage that the comparator 22 outputs is switched from a high level voltage to a low level voltage, the OR circuit 23 continues to output a high level voltage. Accordingly, the voltage that the OR circuit 23 outputs is not switched to a low level voltage by the voltage of the control signal being switched from a high level voltage to a low level voltage.

Thus, as long as the current value Ia of the current flowing via the semiconductor switch 20 is normal, the OR circuit 23 continues to output a high level voltage.

As long as the current value Ia is normal, the voltages, which are respectively output from the AND circuit 26, the delay circuit 25, the comparator 22, and the OR circuit 23, are switched as mentioned above depending on the voltage of the control signal. As long as the current value Ia is normal, the semiconductor switch 20 is ON if the control signal is at a high level voltage, and the semiconductor switch 20 is OFF if the control signal is at a low level voltage.

The delay circuit 25 is constituted by, for example, a resistance, a capacitor, and a diode. The input terminal of the inverter 24 and one end of the capacitor are connected, for example, to one end of the resistance, and the other end of the capacitor is grounded. The anode and cathode of the diode are respectively connected to the one end and the other end of the resistance. The control signal is input to the other end of the resistance. If the voltage of the control signal is switched from a low level voltage to a high level voltage, a current flows to the capacitor via the resistance. Then, the capacitor is gradually charged, and the voltage across the capacitor gradually increases. If the predetermined time period has elapsed after the voltage of the control signal is switched, the voltage across the capacitor is larger than or equal to a certain voltage, and the voltage that the delay circuit 25 outputs is switched from a low level voltage to a high level voltage. Also, if the voltage of the control signal is switched from a high level voltage to a low level voltage, a current flows from the capacitor via the diode. As a result, the capacitor rapidly discharges, and the voltage across the capacitor immediately decreases to the voltage lower than the certain voltage. Accordingly, if the voltage of the control signal is switched from a high level voltage to a low level voltage, the voltage that the delay circuit 25 outputs is immediately switched from a high level voltage to a low level voltage.

If the predetermined time period has elapsed from the time when the voltage of the control signal was switched from a low level voltage to a high level voltage, when the current value Ia is normal, the AND circuit 26, the delay circuit 25, the comparator 22, and the OR circuit 23 output a high level voltage.

In a state where the control signal is at a high level voltage and the semiconductor switch 20 is ON, if the current value Ia increases and the condition Vds>rc·Ic is satisfied, the voltage that the comparator 22 outputs switches from a high level voltage to a low level voltage. At this time, because the delay circuit 25 outputs a high level voltage, each of the two input terminals of the OR circuit 23 receives a low level voltage, and the voltage that the OR circuit 23 outputs is switched from a high level voltage to a low level voltage. If the OR circuit 23 outputs a low level voltage, the AND circuit 26 outputs a low level voltage regardless of the voltage of the control signal, and the driving circuit 27 turns the semiconductor switch 20 from ON to OFF.

As mentioned above, in a state where the control signal is at a high level voltage and the semiconductor switch 20 is ON, if the condition Vds>rc·Ic is satisfied, the driving circuit 27 turns OFF the semiconductor switch 20 regardless of the voltage of the control signal. In this manner, the current flowing from the battery 11 to the load 12 is forcibly shut off regardless of the voltage of the control signal. The driving circuit 27 serves as a switching unit.

If the semiconductor switch 20 is OFF, as mentioned above, the comparator 22 outputs a low level voltage. For this reason, the comparator 22 continues to output a low level voltage after the current was forcibly shut off. Accordingly, after the current was forcibly shut off, as long as the control signal is at a high level voltage, the delay circuit 25 outputs a high level voltage, and the OR circuit 23 outputs a low level voltage. If the voltage of the control signal is switched from a high level voltage to a low level voltage, the delay circuit 25 outputs a low level voltage, and thus the OR circuit 23 outputs a high level voltage. For this reason, the forced shutoff of the current that has been performed regardless of the voltage of the control signal is canceled. After the forced shutoff is canceled, the semiconductor switch 20 is turned ON or OFF based on the voltage of the control signal until when the current is forcibly shut off again.

As mentioned above, in the power supply control apparatus 10, if the condition Vds>rc·Ic is satisfied in a state where the semiconductor switch 20 is ON, the semiconductor switch 20 is turned OFF. As mentioned above, the voltage Vds is the voltage between the drain and source of the semiconductor switch 20, the resistance value rc is the resistance value of the resistance Rc, and the current value Ic is the current value of the current that is pulled in by the current circuit 21. In addition, as previously mentioned, the voltage Vds given by the product of the current value Ia of the current that flows via the semiconductor switch 20 and the ON resistance value ron of the semiconductor switch 20. Accordingly, satisfying Vds>rc·Ic corresponds to satisfying Ia>rc·Ic/ron. A threshold Ith of the current value Ia is given by the following equation (1).

$$Ith = rc \cdot Ic / ron \tag{1}$$

In the state where the semiconductor switch 20 is ON, if the current value Ia exceeds the threshold Ith, the semiconductor switch 20 is turned OFF.

The ON resistance value ron of the semiconductor switch 20 increases if the ambient temperature of the semiconductor switch 20 rises, and decreases if the ambient temperature of the semiconductor switch 20 falls. Similar to the ON resistance value ron of the semiconductor switch 20, the current value Ic of the current that is pulled in by the current circuit 21 also increases if the ambient temperature of the semiconductor switch 20 rises, and decreases if the ambient temperature of the semiconductor switch 20 falls.

As mentioned above, the current value Ic fluctuates in the same direction as the fluctuation direction of the ON resistance value ron depending on the ambient temperature of the semiconductor switch 20. Also, the resistance rc is approximately constant regardless of the ambient temperature of the semiconductor switch 20. For this reason, the threshold Ith of the current value Ia expressed by the equation (1) is approximately constant regardless of the ambient temperature of the semiconductor switch 20.

As mentioned above, if the ambient temperature of the semiconductor switch 20 is constant, the current value Ic is constant or approximately constant, regardless of the drain voltage of the semiconductor switch 20. The resistance values rc and ron are also constant or approximately constant, regardless of the drain voltage of the semiconductor switch 20. For this reason, the threshold Ith of the current value Ia is constant or approximately constant, regardless of the drain voltage of the semiconductor switch 20, that is, the output voltage Vs of the battery 11.

The following describes the reason why the current value Ia fluctuates in the same direction as the fluctuation direction of the ON resistance value ron depending on the ambient temperature of the semiconductor switch 20, and why the current value Ia does not fluctuate, or hardly fluctuates, depending on the drain voltage of the semiconductor switch 20.

Figure 3:
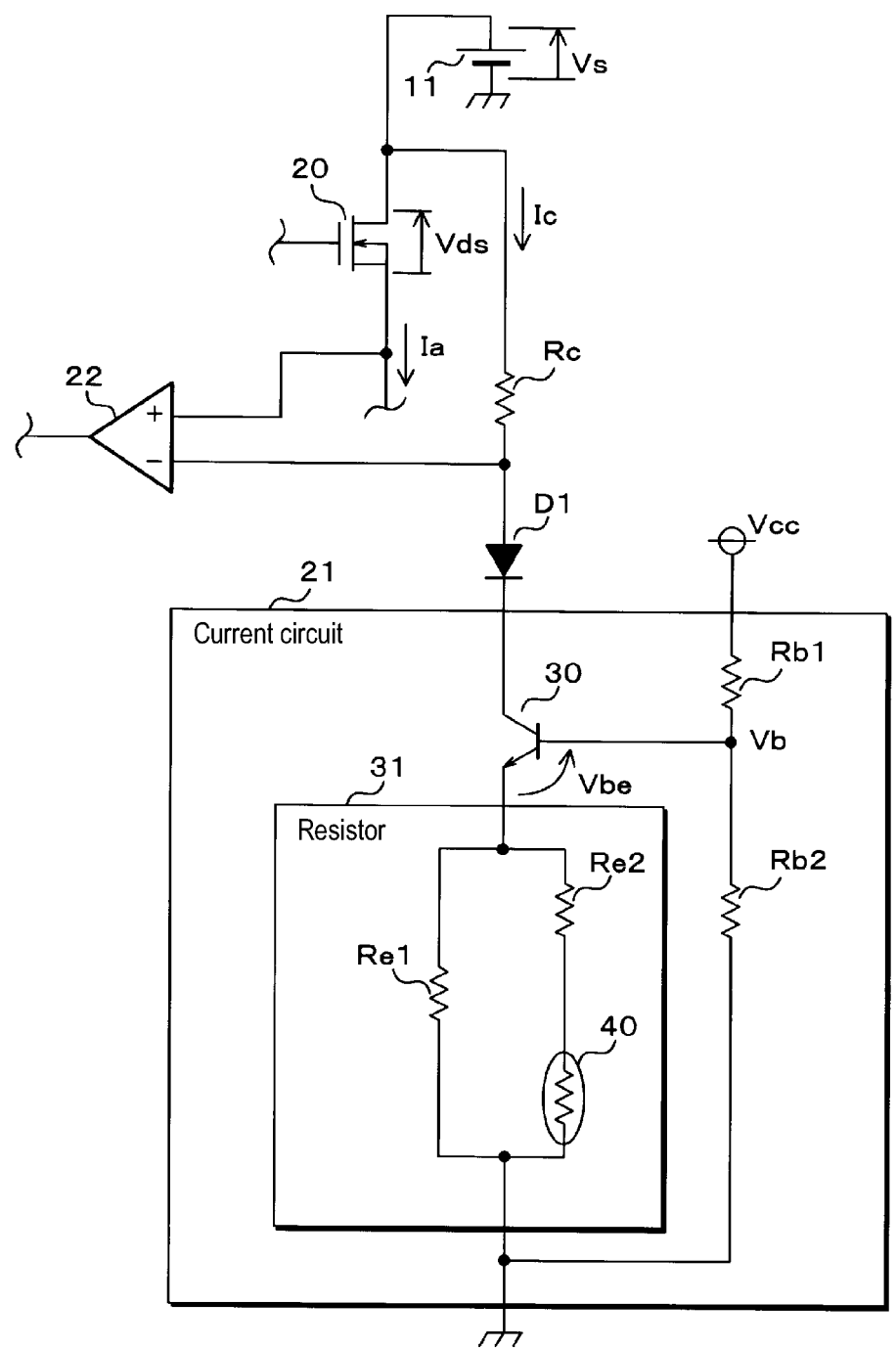
FIG. 3 is a circuit diagram of a current circuit.

FIG. 3 is a circuit diagram of the current circuit 21. The current circuit 21 has a transistor 30, a resistor 31, and resistances Rb1 and Rb2. The resistor 31 has a thermistor 40 and resistances Re1 and Re2. The transistor 30 is an NPN bipolar transistor.

The collector of the transistor 30 is connected to the cathode of the diode D1. Accordingly, the collector of the transistor 30 is connected to the other end of the resistance Rc via the diode D1. The emitter of the transistor 30 is connected to ends on one side of resistances Re1 and Re2 included in the resistor 31. Ends on one side of the resistances Re1 and ret correspond to one end of the resistor 31. In the resistor 31, the other end of the resistance Re2 is connected to one end of the thermistor 40. The other ends of the thermistor 40 and the resistance Re1 correspond to the other end of the resistor 31, and are grounded. In this manner, in the resistor 31, the series circuit constituted by the resistance Re2 and the thermistor 40 is connected to the resistance Re1 in parallel. The resistance Re1 serves as a second resistance, and the resistance Re2 serves as a third resistance.

The base of the transistor 30 is connected to ends on one side of the resistances Rb1 and Rb2. A voltage is applied to the other end of the resistance Rb1. As mentioned above, this voltage Vcc is constant. The other end of the resistance Rb2 is grounded.

In the transistor 30, the resistance between the collector and the emitter is adjusted such that the voltage between its base and emitter is a voltage Vbe, for example, 0.7V. The collector, base, and emitter included in the transistor 30 respectively serve as a first terminal, a second terminal, and a third terminal.

The resistances Rb1 and Rb2 divide the voltage that is applied to the other end of the resistance Rb1, and the divided voltage is applied to the base of the transistor 30. The base voltage Vb of the transistor 30 with respect to the ground potential is a voltage that is divided by the resistances Rb1 and Rb2. The voltage Vb is expressed as follows, using the voltage Vcc, the resistance value rb1 of the resistance Rb1, and the resistance value rb2 of the resistance Rb2.

$$Vb = Vcc \cdot rb2/(rb1+rb2)$$

The resistance values rb1 and rb2 are constant. Also, as mentioned above, the voltage Vcc that is applied to the other end of the resistance Rb1 is also constant. Accordingly, the voltage Vb is also constant.

The current that is pulled in from the drain of the semiconductor switch 20 via the resistance Rc flows between the collector and emitter of the transistor 30. Also, a current flows to the base of the transistor 30 via the resistance Rb1. The currents flowing to the collector and base of the transistor 30 flow through the resistor 31.

As mentioned above, because the voltage Vb is constant, the transistor 30 adjusts the resistance between its collector and the emitter, that is, the current value Ic of the current that is pulled in by the current circuit 21 such that its emitter voltage is Vb−Vbe.

The current flowing through the base of the transistor 30 is expressed as, by using a constant hfe, Ic/hfe. Accordingly, the current flowing through the resistor 31 is expressed as (1+hfe)·Ic/hfe. The emitter voltage of the transistor 30 with respect to the ground potential is given by the product of the current value flowing the resistor 31 and the resistance value ra of the resistor 31. Accordingly, the transistor 30 adjusts the current value Ic such that Vb−Vbe=(1+hfe)·ra·Ic/hfe is satisfied. Therefore, for the current value Ic, the following equation (2) is satisfied.

$$Ic = (Vb - Vbe) \cdot hfe/((1+hfe) \cdot ra) \qquad (2)$$

The voltages Vb and Vbe, the constant hfe, and the resistance value ra do not fluctuate, or hardly fluctuate, depending on the drain voltage of the semiconductor switch 20, that is, the output voltage Vs of the battery 11. Therefore, the current value Ic of the current that is pulled in by the current circuit 21 does not fluctuate, or hardly fluctuates, depending on the drain voltage of the semiconductor switch 20. The resistance value rc of the resistance Rc and the ON resistance value ron of the semiconductor switch 20 do not fluctuate, or hardly fluctuate, depending on the drain voltage of the semiconductor switch 20. Accordingly, the threshold Ith shown by rc·Ic/ron does not fluctuate, or hardly fluctuates, depending on the drain voltage of the semiconductor switch 20.

On the other hand, the current value Ic fluctuates in the same direction as the fluctuation direction of the ON resistance value ron of the semiconductor switch 20, depending on the ambient temperature of the semiconductor switch 20.

Figure 4:
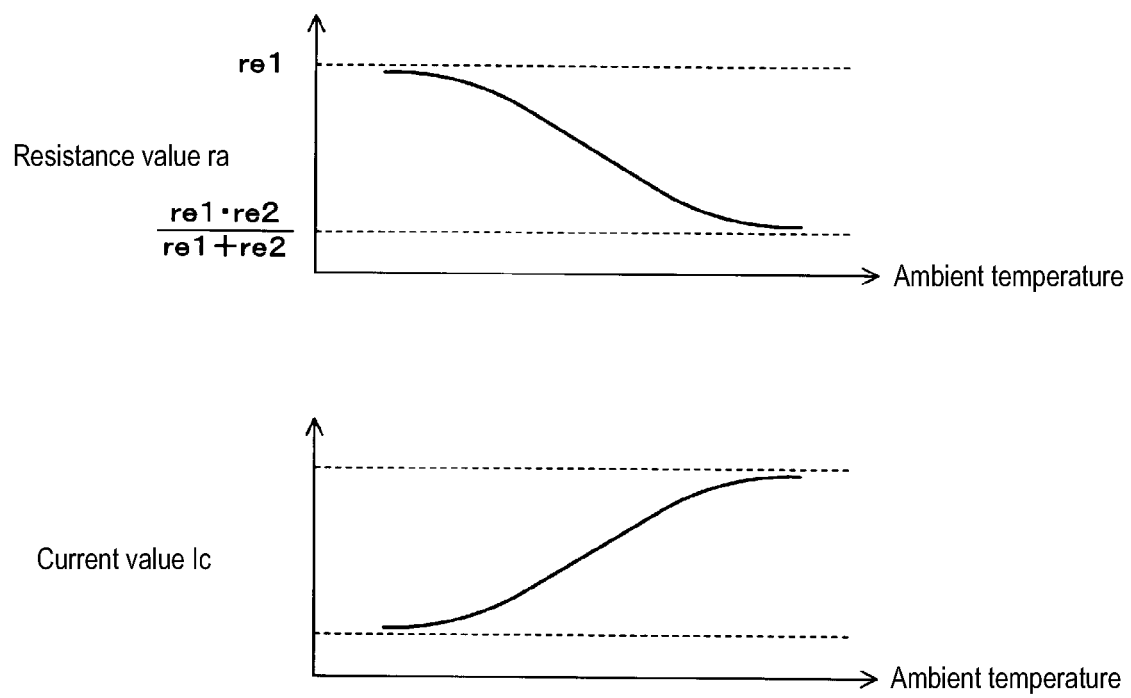
FIG. 4 is a diagram illustrating temperature dependency of a current pulled in by the current circuit.

FIG. 4 is a diagram illustrating temperature dependency of the current value Ic that is pulled in by the current circuit 21. FIG. 4 shows the relationship between the resistance value ra of the resistor 31 and the ambient temperature of the semiconductor switch 20, and the relationship between the current value Ic and the ambient temperature of the semiconductor switch 20. In all graphs shown in FIG. 4, the horizontal axes show the ambient temperature of the semiconductor switch 20. The resistance value ra of the resistor 31 is expressed as the following equation (3), using the resistance value rth of the thermistor 40, the resistance value re1 of the resistance Re1, and the resistance value re2 of the resistance Ret.

$$ra = re1 \cdot (re2 + rth)/(re1 + re2 + rth) \qquad (3)$$

The resistance value rth of the thermistor 40 decreases if the ambient temperature of the semiconductor switch 20 rises, and increases if the ambient temperature of the semiconductor switch 20 falls. Accordingly, the resistance value rth fluctuates in the direction opposite to the fluctuation direction of the ON resistance value ron of the semiconductor switch 20, depending on the ambient temperature of the semiconductor switch 20. If the resistance value rth is zero ohms, the resistance value ra is expressed as re1·re2/(re1+re2), and is the smallest. This value is the combined resistance value of the circuit in which the resistances Re1 and Ret are connected in parallel. If the resistance value rth is infinite, the resistance value ra coincides with the resistance value re1, and is the largest.

If the ambient temperature of the semiconductor switch 20 is low, the resistance value rth is large, and thus the resistance value ra that is expressed by the equation (3) is also large. If the resistance value ra is large, as shown in the equation (2), the current value Ia of the current that is pulled in by the current circuit 21 is small. As the ambient temperature of the semiconductor switch 20 is lower, the resistance value ra approaches the resistance value re1.

As mentioned above, the ON resistance value ron of the semiconductor switch 20 increases if the ambient temperature of the semiconductor switch 20 rises, and decreases if the ambient temperature of the semiconductor switch 20 falls. The resistance value rth of the thermistor 40 fluctuates in the direction opposite to the fluctuation direction of the ON resistance value ron, depending on the ambient temperature of the semiconductor switch 20. For this reason, the resistance value ra of the resistor 31 also fluctuates in the direction opposite to the fluctuation direction of the ON resistance value ron, depending on the ambient temperature of the semiconductor switch 20.

If the ambient temperature of the semiconductor switch 20 is high, the resistance value rth is small, and thus the resistance value ra that is expressed by the equation (3) is also small. If the resistance value ra is small, as shown in the equation (2), the current value Ia of the current that is pulled in by the current circuit 21 is large. As the ambient temperature of the semiconductor switch 20 is higher, the resistance value ra approaches re1·re2/(re1+re2).

As mentioned above, the ON resistance value ron of the semiconductor switch 20 increases if the ambient temperature of the semiconductor switch 20 rises, and decreases if the ambient temperature of the semiconductor switch 20 falls. As shown in FIG. 4, the resistance value ra of the resistor 31 fluctuates in the direction opposite to the fluctuation direction of the ON resistance value ron, depending on the ambient temperature of the semiconductor switch 20. For this reason, as shown in FIG. 4, the current value Ic of the current flowing via the semiconductor switch 20 fluctuates in the same direction as the fluctuation direction of the ON resistance value ron, depending on the ambient temperature of the semiconductor switch 20.

The upper limit of the current value Ic is the current value Ic obtained by substituting re1·re2/(re1+re2) for the resistance value ra in the equation (2). The lower limit of the current value Ic is the current value Ic obtained by substituting re1 for the resistance value ra in the equation (2).

Figure 5:
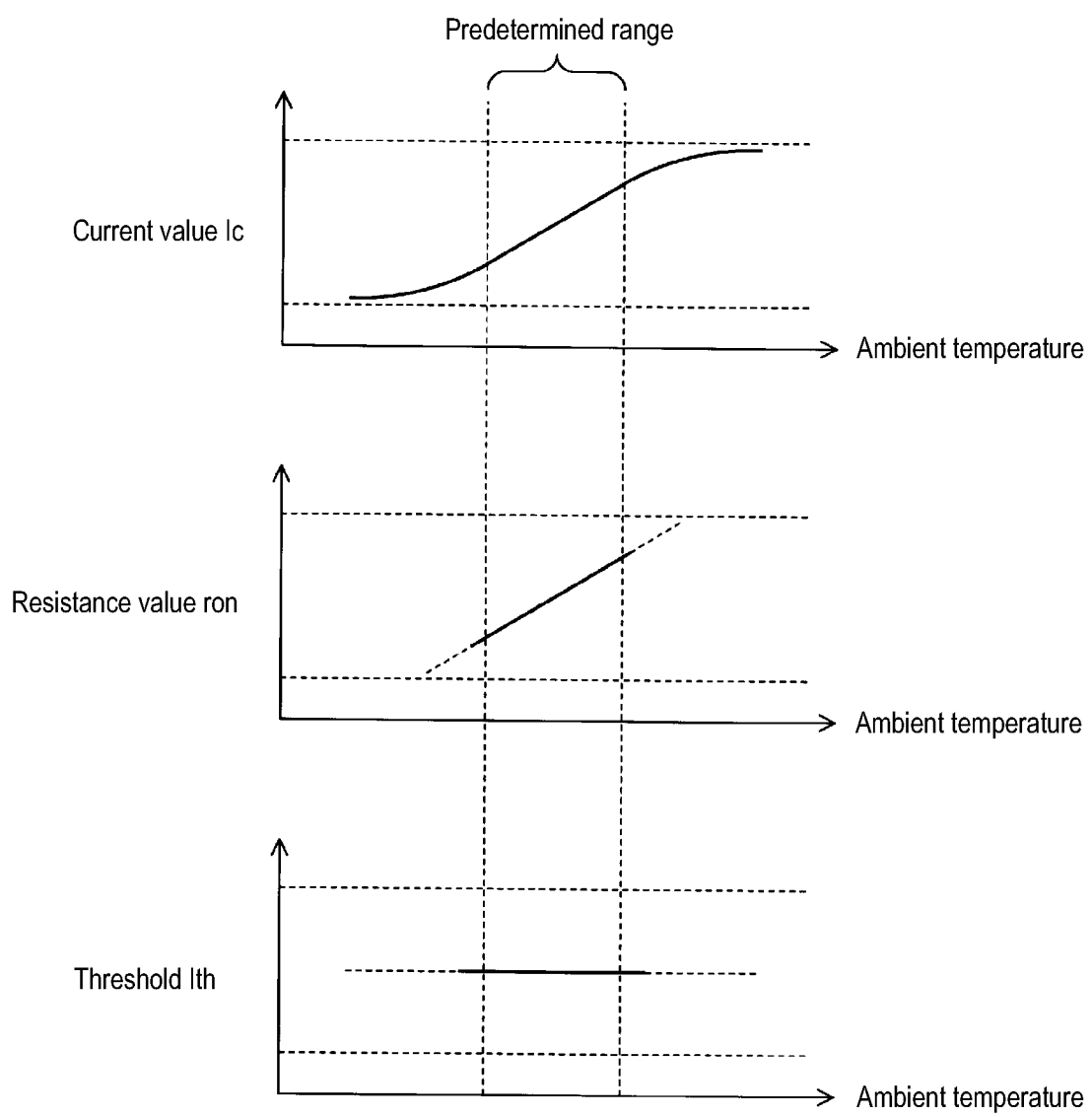
FIG. 5 is a diagram illustrating temperature dependency of a threshold.

FIG. 5 is a diagram illustrating the temperature dependency of the threshold Ith. FIG. 5 shows the relationship between the current value Ic and the ambient temperature of the semiconductor switch 20, the relationship between the resistance value ron and the ambient temperature of the semiconductor switch 20, and the relationship between the threshold Ith and the ambient temperature of the semiconductor switch 20. In all graphs shown in FIG. 5, the horizontal axes show the ambient temperature of the semiconductor switch 20.

As mentioned above, the threshold Ith is the threshold of the current value Ia of the current that flows via the semiconductor switch 20. The current value Ic is the current value of the current that is pulled in by the current circuit 21. The resistance value ron is the ON resistance value of the semiconductor switch 20.

As mentioned above, the current value Ic increases if the ambient temperature of the semiconductor switch 20 rises. As shown in FIG. 5, in a case where the ambient temperature of the semiconductor switch 20 is within a predetermined range, the shape of the graph of the current value Ic with respect to the ambient temperature of the semiconductor switch 20 substantially coincides with the shape of the graph of the resistance value ron with respect to the ambient temperature of the semiconductor switch 20. In other words, if the ambient temperature of the semiconductor switch 20 is within the predetermined range, the ratio of the current value Ic and the resistance value ron is approximately constant.

As mentioned above, the resistance value rc of the resistance Rc hardly fluctuates depending on the ambient temperature of the semiconductor switch 20. For this reason, if the ambient temperature of the semiconductor switch 20 is within the predetermined range, the threshold Ith expressed by the equation (1) is approximately constant, regardless of the ambient temperature of the semiconductor switch 20. If the ambient temperature of the semiconductor switch 20 is within the predetermined range, let us assume that the threshold Ith is, for example, approximately 10 A. As long as the ambient temperature of the semiconductor switch 20 is within the predetermined range, the semiconductor switch 20 turns from ON to OFF if the current value Ia flowing via the semiconductor switch 20 exceeds approximately 10 A.

The predetermined range is an envisioned range of the ambient temperature of the semiconductor switch 20. In this range, the voltages Vb and Vbe, the constant hfe, the resistances re1 and ret, and the temperature characteristic of the resistance rth are set such that the current value Ic fluctuates in the same manner as the ON resistance value ron with respect to the ambient temperature of the semiconductor switch 20.

In the power supply control apparatus 10, because the current value Ia flowing via the semiconductor switch 20 is not required to be calculated, the semiconductor switch 20 can be immediately turned OFF if the current value Ia exceeds the threshold Ith. Accordingly, the manufacturing cost of the power supply control apparatus 10 is inexpensive.

Second Embodiment

In the first embodiment, it is sufficient that the resistance value ra of the resistor 31 fluctuates in the direction opposite to the fluctuation direction of the semiconductor switch 20, depending on the ambient temperature of the semiconductor switch 20. For this reason, the configuration of the resistor 31 is not limited to the configuration in which the series circuit constituted by the resistance Ret and the thermistor 40 is connected to the resistance Re1 in parallel.

Hereinafter, a second embodiment will be described in terms of differences from the first embodiment. Configurations other than the later-described configurations are similar to those in the first embodiment, and thus constituent portions that are similar to those in the first embodiment are given similar reference numerals, and their redundant description will be omitted.

Figure 6:
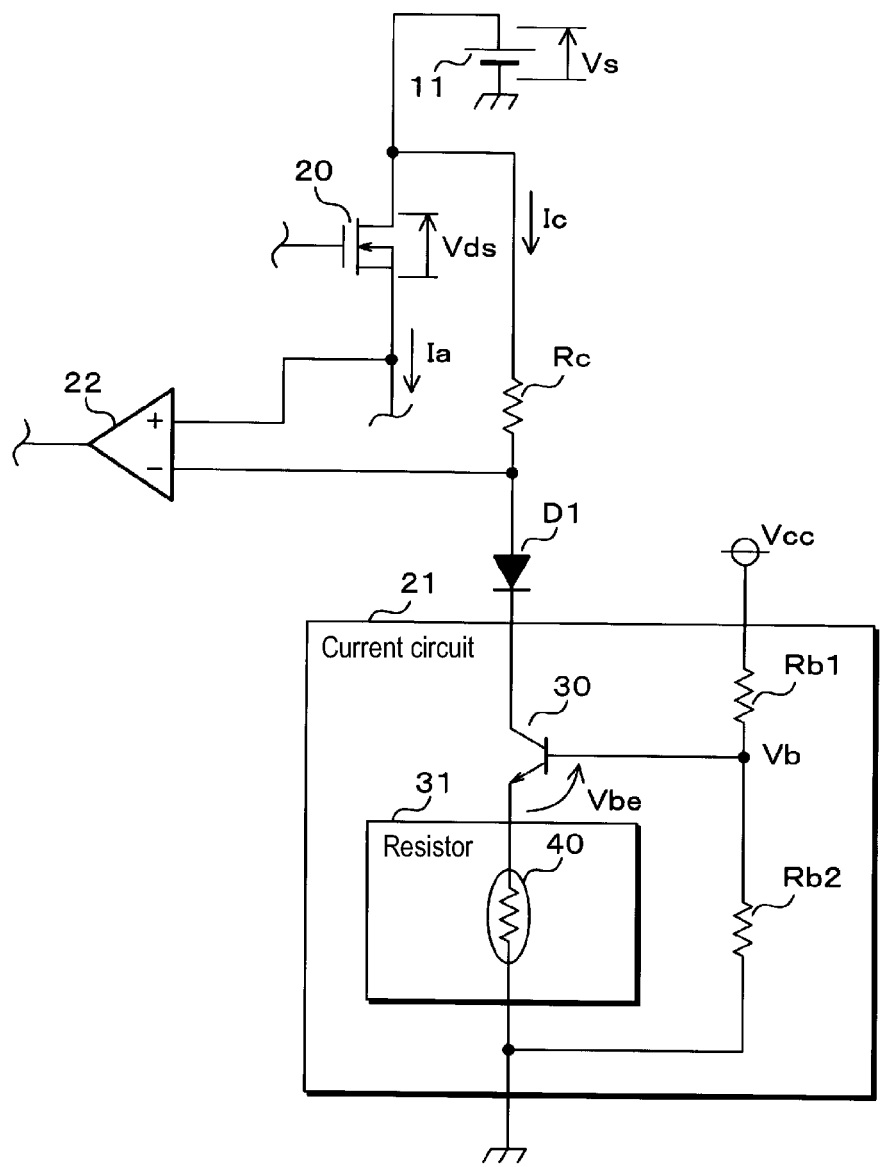
FIG. 6 is a circuit diagram of a current circuit according to a second embodiment.

FIG. 6 is a circuit diagram of a current circuit 21 according to the second embodiment. In the power supply system 1 according to the second embodiment, the configuration of the resistor 31 differs from that of the power supply system 1 according to the first embodiment. Similar to the first embodiment, the resistor 31 has the thermistor 40. The one end of the thermistor 40 corresponds to the one end of the resistor 31, and is connected to the emitter of the transistor 30. The other end of the thermistor 40 corresponds to the other end of the resistor 31, and is grounded.

The resistance value ra of the resistor 31 is the resistance value rth of the thermistor 40. As mentioned in the first embodiment, the resistance value rth fluctuates in the direction opposite to the fluctuation direction of the ON resistance value ron of the semiconductor switch 20, depending on the ambient temperature of the semiconductor switch 20. Accordingly, the current value Ic expressed by the equation (2) fluctuates in the same direction as the fluctuation direction of the ON resistance value ron of the semiconductor switch 20, depending on the ambient temperature of the semiconductor switch 20.

Therefore, in a predetermined range, the voltages Vb and Vbe, the constant hfe, and the temperature characteristic of the resistance rth are set such that the current value Ic fluctuates in the same manner as the ON resistance value ron with respect to the ambient temperature of the semiconductor switch 20. In this manner, if the ambient temperature of the semiconductor switch 20 is within the predetermined range, the threshold Ith that is expressed by the equation (1) is approximately constant, regardless of the ambient temperature of the semiconductor switch 20.

As mentioned in the first embodiment, the resistance value rth does not fluctuate, or hardly fluctuates, depending on the drain voltage of the semiconductor switch 20. Accordingly, the current value Ic that is expressed by the equation (2) does not fluctuate, or hardly fluctuates, depending on the drain voltage of the semiconductor switch 20. As a result, also the threshold Ith that is expressed by the equation (1) does not fluctuate, or hardly fluctuates, depending on the drain voltage of the semiconductor switch 20.

The power supply control apparatus 10 according to the second embodiment similarly produces the effect of the power supply control apparatus 10 according to the first embodiment.

Note, that in the second embodiment, the configuration of the resistor 31 may also be the configuration in which a not-shown resistance is connected to the thermistor 40 in series. Also in this case, if the resistance value of the resistance that is connected to the thermistor 40 in series does not fluctuate depending on the ambient temperature of the semiconductor switch 20, it is obvious that the resistance value ra of the resistor 31 fluctuates in the direction opposite to the fluctuation direction of the ON resistance value ron of the semiconductor switch 20 depending on the ambient temperature of the semiconductor switch 20.

Third Embodiment

In the first embodiment, it is sufficient that the configuration of the current circuit 21 is a configuration in which the current value Ic of the current that is pulled in via the resistance Rc fluctuates in the direction opposite to the fluctuation direction of the ON resistance value ron of the semiconductor switch 20, depending on the ambient temperature of the semiconductor switch 20. Accordingly, the configuration of the current circuit 21 is not limited to the configuration in which a constant voltage is applied to the base of the transistor 30, and the one end of the resistor 31 is connected to the emitter of the transistor 30.

Hereinafter, a third embodiment will be described in terms of differences from the first embodiment. Configurations other than the later-described configurations are similar to those in the first embodiment, and thus constituent portions that are similar to those in the first embodiment are given similar reference numerals, and their redundant description will be omitted.

Figure 7:
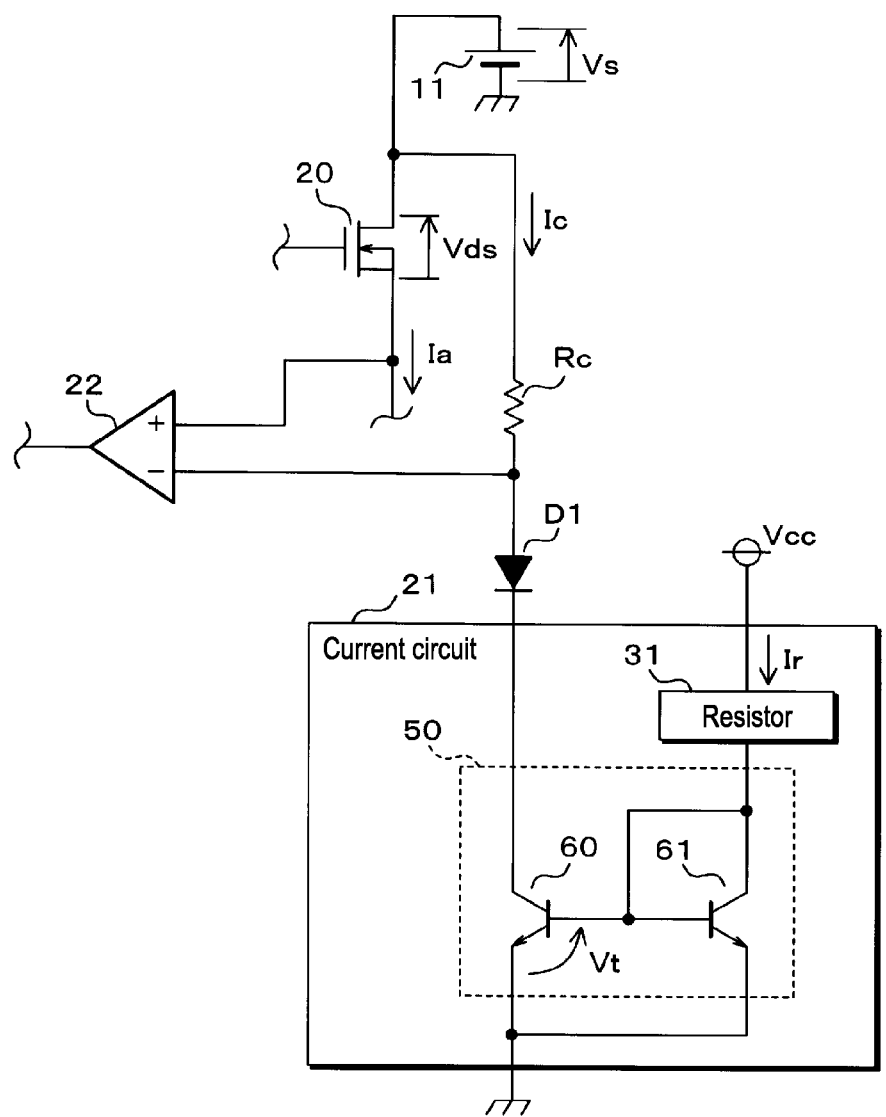
FIG. 7 is a circuit diagram of a current circuit according to a third embodiment.

FIG. 7 is a circuit diagram of a current circuit 21 according to the third embodiment. In the power supply system 1 according to the third embodiment, the configuration of the current circuit 21 differs from that of the power supply system 1 according to the first embodiment. Similar to the first embodiment, the current circuit 21 according to the third embodiment has the resistor 31. The current circuit 21 further has a current mirror circuit 50. The current mirror circuit 50 has two transistors 60 and 61. The transistors 60 and 61 are NPN bipolar transistors.

In the current circuit 21, a voltage is applied to the one end of the resistor 31, that is, to the ends on one side of the resistances Re1 and Ret. Similar to the first embodiment, this voltage Vcc is constant. The other end of the resistor 31, that is, the other ends of the resistance Re1 and the thermistor 40 are connected to the bases of the transistors 60 and 61, and the collector of the transistor 61. The collector of the transistor 60 is connected to the cathode of the diode D1. The emitters of the transistors 60 and 61 are grounded.

In the transistor 60, the resistance between its collector and emitter is adjusted such that the voltage between its base and emitter is a predetermined voltage Vt. The resistance between collector and emitter of the transistor 61 is adjusted such that the voltage between its base and emitter substantially coincides with the voltage Vt. Accordingly, the current value Ir of the current flowing via the resistor 31 substantially coincides with the current value Ic of the current that is pulled in by the current circuit 21 via the resistance Rc. The current value Ir is expressed as the following equation (4).

$$Ir=(Vcc-Vt)/ra \tag{4}$$

As mentioned in the first embodiment, the resistance value ra is a resistance value of the resistor 31.

The voltages Vcc and Vt hardly fluctuate depending on the ambient temperature of the semiconductor switch 20. As mentioned in the first embodiment, the resistance value ra of the resistor 31 fluctuates in the direction opposite to the fluctuation direction of the ON resistance value ron of the semiconductor switch 20, depending on the ambient temperature of the semiconductor switch 20. For this reason, the current value Ir of the current flowing via the resistor 31, that is the current value Ic of the current that is pulled by the current circuit 21 via the resistance Rc fluctuates in the same direction as the fluctuation direction of the ON resistance value ron of the semiconductor switch 20.

In the predetermined range as mentioned in the first embodiment, the voltages Vcc and Vt, the resistances re1 and re2, and the temperature characteristic of the resistance value rth are set such that the current value Ir, that is, the current value Ic fluctuates in the same manner as the ON resistance value ron with respect to the ambient temperature of the semiconductor switch 20. As mentioned in the first embodiment, the resistances re1, re2, and rth are the resistance values of the resistances Re1 and Ret, and the thermistor that are included in the resistor 31, respectively.

In the power supply control apparatus 10 in the third embodiment that is configured as mentioned above, if the ambient temperature of the semiconductor switch 20 is within the predetermined range, the threshold Ith that is expressed by the equation (1) is constant, regardless of the ambient temperature of the semiconductor switch 20.

Also, the voltages Vcc and Vt and the resistance value ra do not fluctuate, or hardly fluctuate, depending on the drain voltage of the semiconductor switch 20. For this reason, if the ambient temperature of the semiconductor switch 20 is constant, the current value Ir, that is, the current value Ic is constant or approximately constant, regardless of the drain voltage of the semiconductor switch 20. As a result, the threshold Ith does not fluctuate, or hardly fluctuates, depending on the drain voltage of the semiconductor switch 20.

The power supply control apparatus 10 according to the third embodiment similarly produces the effect of the power supply control apparatus 10 according to the first embodiment.

Note, that in the third embodiment, the current mirror circuit 50 is not limited to the circuit in which the current value Ic substantially coincides with the current value Ir, and may be a circuit in which the current value Ic is a predetermined multiple of the current value Ir. Furthermore, the transistors 60 and 61 of the current mirror circuit 50 are not limited to NPN bipolar transistors, and may also be, for example, PNP bipolar transistors. In this case, the emitter of the transistor 60 is connected to the cathode of the diode D1, and the base of the transistor 60 is connected to the base and collector of the transistor 61. A certain voltage is applied to the emitter of the transistor 61. The collector of the transistor 61 is further connected to the one end of the resistor 31. The other end of the resistor 31 and the collector of the transistor 60 are grounded.

Also, the transistors included in the current mirror circuit 50 are not limited to bipolar transistors, and may also be FETs. Furthermore, the number of transistors included in the current mirror circuit 50 is not limited to two, and may also be three or more.

In addition, the configuration of the resistor 31 in not limited to the configuration in the first embodiment, and may also be the configuration in the second embodiment.

In the first to third embodiments, the semiconductor switch 20 is not limited to an N-channel FET, and may also be, for example, a P-channel FET. In this case, the source of the semiconductor switch 20 is connected to the positive electrode of the battery 11 and the one end of the resistance Rc. Also, the drain of the semiconductor switch 20 is connected to the one end of the load 12 and the plus terminal of the comparator 22. In this configuration, the source and drain of the semiconductor switch 20 respectively serve as the current input terminal and the current output terminal. If the AND circuit 26 outputs a high level voltage, the driving circuit 27 decreases the gate voltage of the semiconductor switch 20, and turns ON the semiconductor switch 20. Also, If the AND circuit 26 outputs a low level voltage, the driving circuit 27 increases the gate voltage of the semiconductor switch 20, and turns OFF the semiconductor switch 20.

If the ON resistance value ron of the semiconductor switch 20 decreases with an increase in the ambient temperature of the semiconductor switch 20, it is sufficient that a thermistor whose resistance value rth increases with an increase in the ambient temperature of the semiconductor switch 20 is used as the thermistor 40. Also in this case, the current value Ic fluctuates in the same direction as the fluctuation direction of the ON resistance value ron of the semiconductor switch 20, depending on the ambient temperature of the semiconductor switch 20, and the threshold Ith is approximately constant regardless of the ambient temperature of the semiconductor switch 20.

The first to third embodiments that have been disclosed above are examples in all aspects, and should be considered to be not restrictive. The scope of the present disclosure is indicated not by the above description but by the claims, and is intended to include all modifications that are made within the meaning and scope equivalent to the claims.

The invention claimed is:

1. A power supply control apparatus for controlling power supply via a semiconductor switch comprising:
    a resistance whose one end is connected to a current input terminal of the semiconductor switch;
    a current circuit that is connected to the other end of the resistance and configured to pull in, via the resistance, a current whose current value fluctuates, depending on an ambient temperature of the semiconductor switch, in the same direction as a fluctuation direction of an ON resistance value of the semiconductor switch;
    a switching unit configured to turn OFF the semiconductor switch if a voltage at a current output terminal of the semiconductor switch is lower than a voltage at the other end of the resistance;
    a transistor that has a first terminal connected to the other end of the resistance, a second terminal to which a constant voltage is applied, and a third terminal, a resistance value of the transistor between the first terminal and the third terminal being adjusted such that the voltage between the second terminal and the third terminal is a predetermined voltage; and
    a resistor whose one end is connected to the third terminal of the transistor and whose resistance value fluctuates in a direction opposite to the fluctuation direction depending on the ambient temperature.

2. The power supply control apparatus according to claim 1, wherein if the ambient temperature is constant, the current value is approximately constant regardless of the voltage at the current input terminal of the semiconductor switch.

3. The power supply control apparatus according to claim 1, wherein the resistor includes:
    a second resistance whose one end is connected to the third terminal of the transistor; and
    a series circuit that is constituted by a third resistance and a thermistor, and is connected to the second resistance in parallel,
    wherein a resistance value of the thermistor fluctuates in the opposite direction depending on the ambient temperature.

* * * * *